US006429853B1

(12) United States Patent
Chou

(10) Patent No.: US 6,429,853 B1
(45) Date of Patent: Aug. 6, 2002

(54) ILLUMINATION STRUCTURE FOR KEYBOARDS

(75) Inventor: Chin-Wen Chou, Taipei (TW)

(73) Assignee: Shin Jiuh Corp. (TW)

( * ) Notice: Subject to any disclaimer, the term of this patent is extended or adjusted under 35 U.S.C. 154(b) by 0 days.

(21) Appl. No.: 09/531,433

(22) Filed: Mar. 20, 2000

(51) Int. Cl.[7] ............................................... G09G 5/00
(52) U.S. Cl. ......................... 345/168; 362/84; 345/170
(58) Field of Search ................................ 345/168, 170; 400/487, 489, 492; 362/84, 86, 85, 88

(56) References Cited

U.S. PATENT DOCUMENTS

| | | | | |
|---|---|---|---|---|
| 4,449,024 A | * | 5/1984 | Stracener | 200/310 |
| 5,053,928 A | * | 10/1991 | Pasco | 326/24 |
| 5,521,345 A | * | 5/1996 | Wulc | 200/310 |
| 5,607,048 A | * | 3/1997 | Kaizu et al. | 200/313 |
| 5,746,493 A | * | 5/1998 | Jonsson et al. | 362/23 |
| 5,899,553 A | * | 5/1999 | Howell | 362/109 |
| 6,026,283 A | * | 2/2000 | Stephenson | 379/433.07 |
| 6,092,903 A | * | 7/2000 | Higgins, Jr. | 341/22 |
| 6,179,432 B1 | * | 1/2001 | Zhang et al. | 362/84 |
| 6,183,101 B1 | * | 2/2001 | Chien | 362/84 |

* cited by examiner

Primary Examiner—Kent Chang
(74) Attorney, Agent, or Firm—Bacon & Thomas, PLLC

(57) ABSTRACT

An illumination structure for keyboards is provided with a light-indication section in a keyboard for a user to ascertain position of the keyboard easily and for promoting the integral beautification of the same. For realizing abovesaid object, a plurality of pushbutton sets and a first printed circuit board (PCB) used for transmission an instruction of a pressed pushbutton are disposed on the top face of the baseboard. Further, at least a light-indication section is defined in a proper position on the baseboard, and a second PCB is laid underneath the baseboard. A light emitter is arranged on the second PCB at a position corresponding to the light-indication section for emitting light through the latter when power is supplied to the second PCB. By abovesaid construction, a wireless keyboard with light source is built.

6 Claims, 7 Drawing Sheets

ILLUMINATION STRUCTURE FOR KEYBOARDS

BACKGROUND OF THE INVENTION

1. Field of the Invention

This invention relates to an illumination structure for keyboards, particularly to a keyboard having a light-indication section for a user to ascertain keyboard position and for beautifying the keyboard integrally.

2. Description of the Related Art

In compliance with the trend of remote control for easier operation without hurdle, the wireless keyboard presented in recent days seems to be more favorable than the conventional cable keyboard, particularly, as far as the electric home appliance is concerned.

However, up to this moment, most keyboards are still lack of illumination design, hence, a user can hardly locate the keyboard when he is intended to control an illumination switch by operating the keyboard in the dark for example, and instead, he has to fumble about for the power switch on the wall firstly before he can operate the keyboard. It looks something upside down to have the result and the motive been reversed.

SUMMARY OF THE INVENTION

For improving abovesaid defect, a pushbutton set made of transparent material is presented, wherein LEDs (light-emitting diodes) are installed on a PCB (printed circuit board) directly and activated to enable a user to ascertain position of the pushbuttons when power is supplied.

BRIEF DESCRIPTION OF THE DRAWINGS

The related drawings in connection with the detailed description of this invention to be made later are described briefly as follows in which.

DETAILED DESCRIPTION OF THE PREFERRED EMBODIMENT

Figure 1:
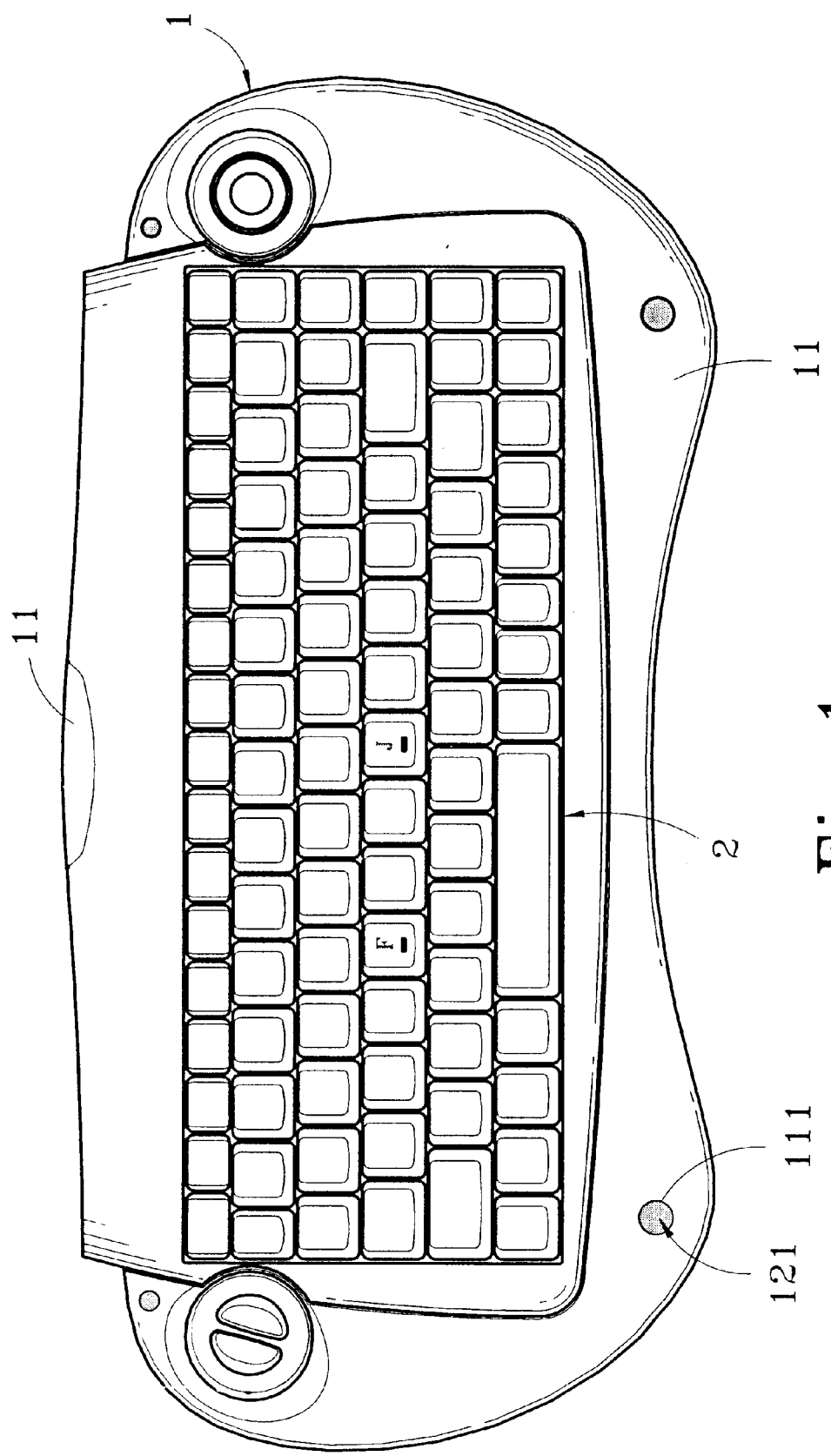
FIG. 1 is a schematic elevational view of this invention.
Figure 2A:
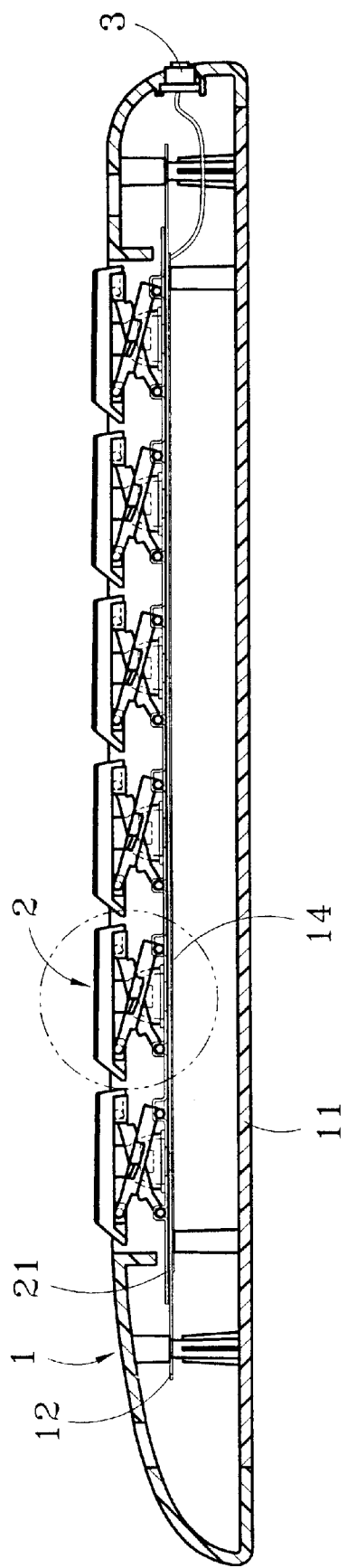
FIGS. 2A, 2B, and 2C are cross-sections illustrating a first embodiment of this invention.
Figure 2B:
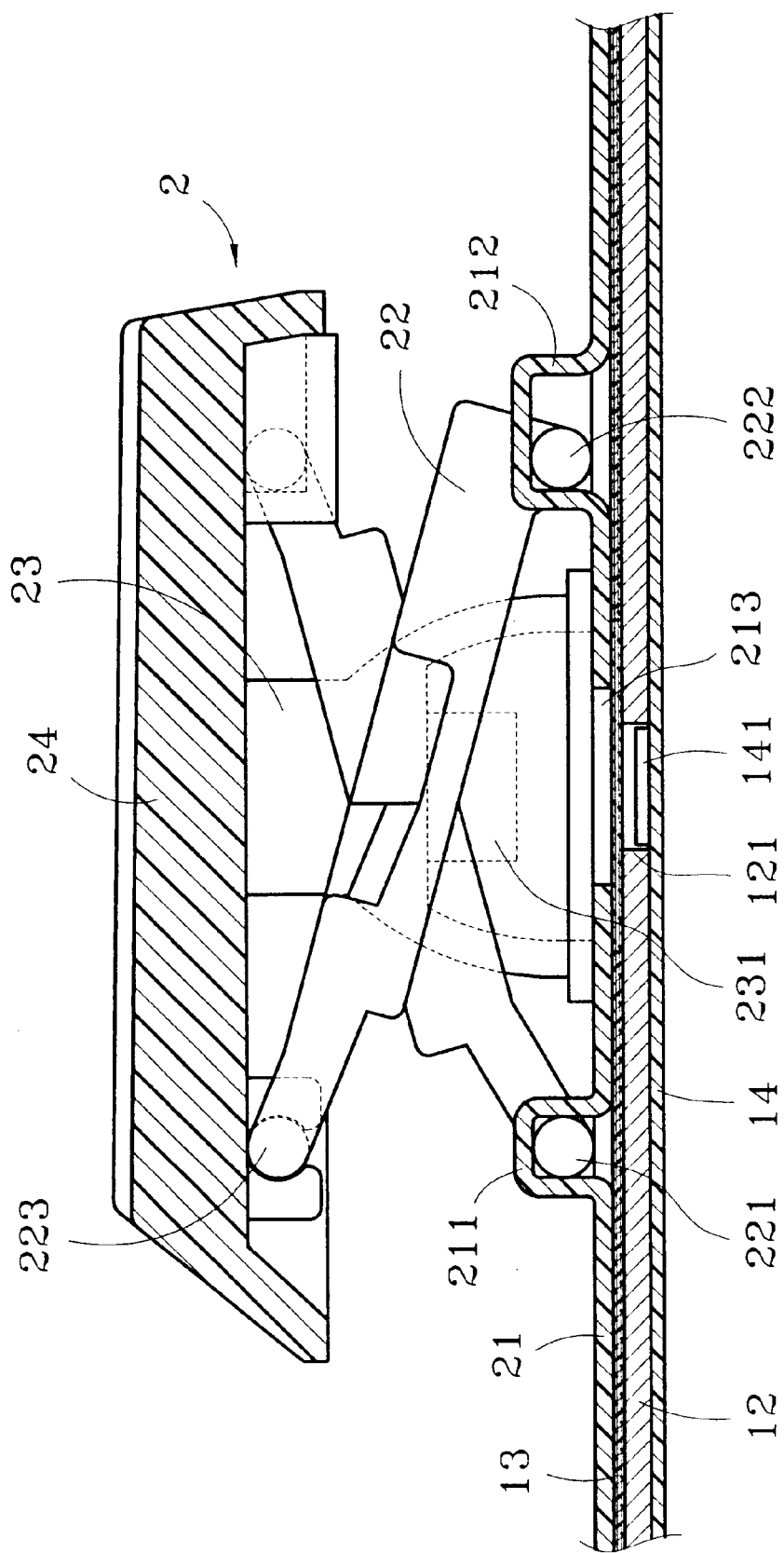

As shown in FIGS. 1, 2A, and 2B, a plurality of pushbutton sets 2 and a first printed circuit board (PCB) 13 used to transmit an instruction according to a pressed pushbutton are disposed on a top face of a baseboard 12 of a keyboard 1, and at least an light-indication section 121 is reserved at a proper position on the baseboard 12. Further, a second PCB 14 is laid underneath the baseboard 12, wherein at least a light emitter 141 is disposed on the second PCB 14 at a position corresponding the light-indication section 121. As soon as power is supplied to the second PCB 14, the light emitter 141 is lightened to illuminate the light-indication section 121 for a user to ascertain position of the keyboard 1 and for beautifying the same integrally.

The foregoing pushbutton set 2 comprises a positioning element 21, including a pivot-joint portion 211 and a slidable portion 212, disposed on the first PCB 13, a bridge 22 having pivot-joint ends 221 and slidable ends 222, a resilient conductive element 23 surrounded by the bridge 22, and a keycap 24 resided on the upper end 223 of the bridge 22, which, the keycap 24 is pressed to create displacement of the resilient conductive element 23. When the keycap 24 is pressed downwards, the bridge 22 is caused to descend by displacement of the slidable ends 222 to in turn push a conductive portion 231 of the resilient conductive element 23 to move downwards to pass through a through hole 213 of the positioning element 21 and contact with the predetermined printed circuit of the first PCB 13 for transmitting an instruction. (The bridge 22 may be installed on the baseboard 12 directly, however, it is ignored herein because of departure from the scope of this invention.)

The light-indication section 121 is formed by perforating a hole in an arbitrary end of the baseboard 12 or in a position of the baseboard 12 corresponding to an arbitrary pushbutton set 2. The light emitter 141 in the position corresponding to the light-indication section 121 may be a light-emitting diode (LED) or a luminescent plate 141', and the count or positions thereof would depend upon the market's requirements or users' habits for adjustment. Moreover, the foregoing second PCB 14 may connect with a power switch 3 independently in order not to affect lifetime of the power supply of the wireless keyboard 1.

Figure 2C:
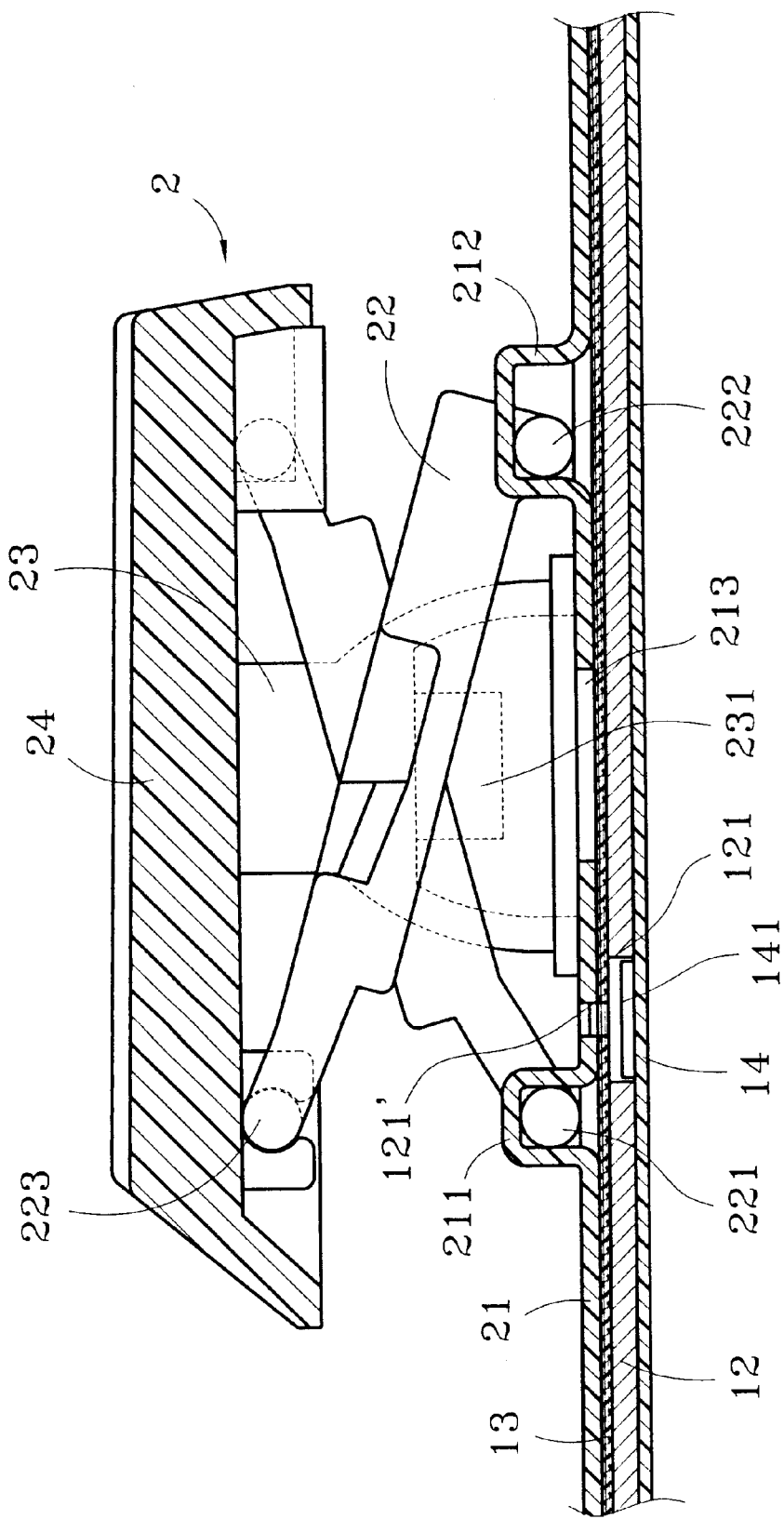

Please refer to FIGS. 1, 2A, 2B, and 2C—a first embodiment of this invention, wherein, an LED set is taken to serve for the light emitter 141. When the power switch 3 is switched to "ON" state, the LED set 141 on the second PCB 14 will emit light and project on the pushbutton set 2 or four ends of the keyboard 1 through the light-indication section 121, or, as shown in FIG. 1, a through hole 111 may be perforated in position of a specified pushbutton set 2, key F and key J for instance, or in four ends of a housing 11 for the light to project out to enable a user to ascertain position of the keyboard 1 or the pushbutton set 2. Besides, as shown in FIG. 2C, for avoiding influence to fabrication or action mode of the keyboard 1, a light-indication section 121' may be arranged at a through hole nearby circumference of the pushbutton set 2. Further, the power switch 3 may be turned off to shut down the power supply during daytime or in case luminous intensity is sufficient for a user to ascertain position of the keyboard 1 easily for energy saving.

Figure 3A:
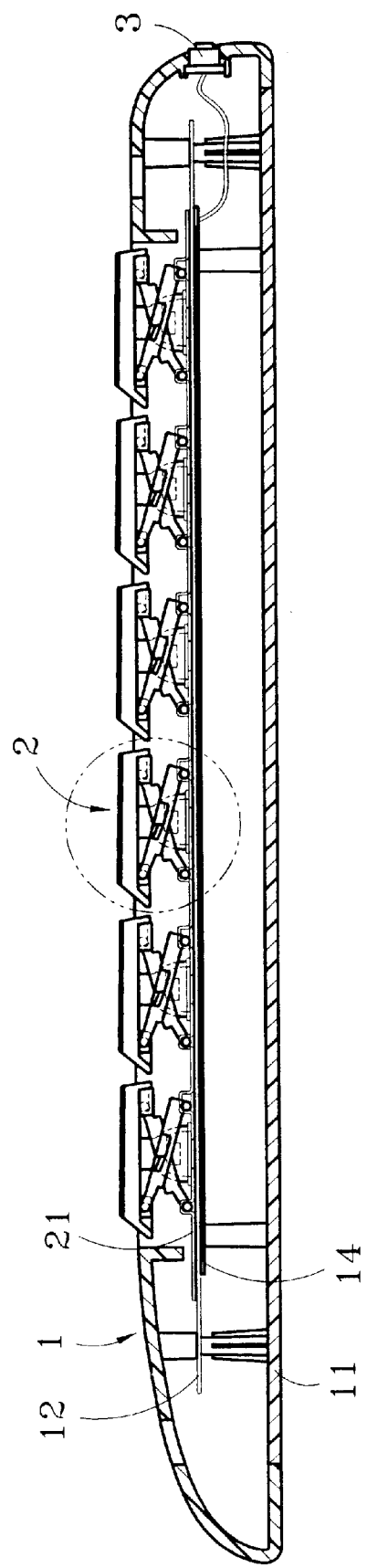
FIGS. 3A and 3B are cross-sections illustrating a second embodiment of this invention.
Figure 3B:
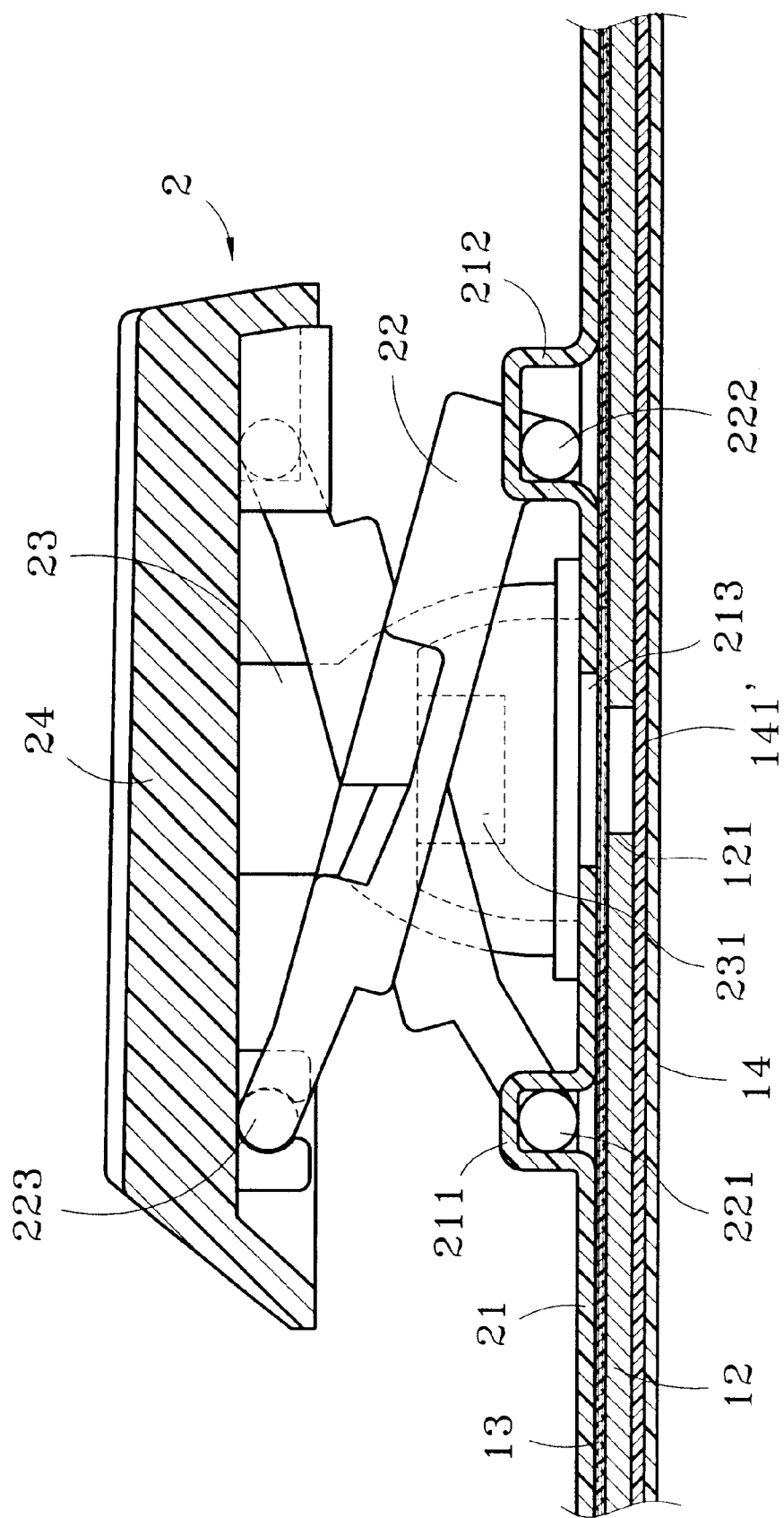

In a second embodiment of this invention shown in FIGS. 3A and 3B, the light emitter 141 on the second PCB 14 may be a LED 141, a luminescent plate 141', a fluorescent plate, or the equivalent.

Figure 4:
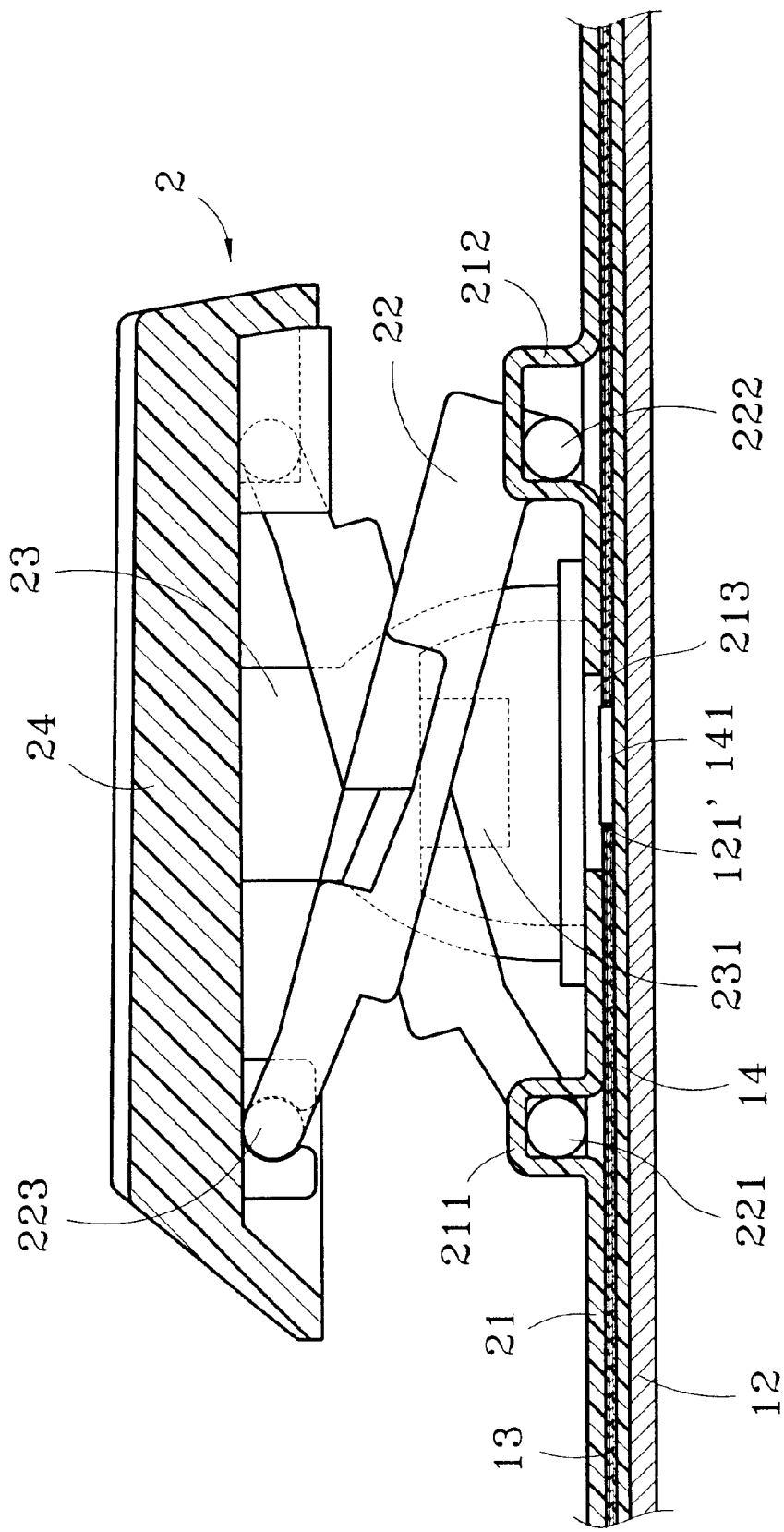
FIG. 4 shows a third embodiment of this invention.

In a third embodiment of this invention shown in FIG. 4, the second PCB 14 may be disposed between the baseboard 12 and the transparent material made first PCB 13 for projecting light through the through hole 111 in the pushbutton set 2 or at an end of the housing 11, or projecting through another light-indication section 121' (a through hole) formed in the first PCB 13.

Although, this invention has been described in terms of preferred embodiments, it is apparent that numerous variations and modifications may be made without departing from the true spirit and scope thereof, as set forth in the following claims.

What is claimed is:

1. An illumination structure for keyboards, comprising:
   a baseboard of a keyboard, the baseboard comprising a plurality of pushbutton sets and a first printed circuit board (PCB), the first PCB transmits one or more instructions when one or more of the pushbutton sets are pressed, the pushbutton sets and the first PCB are disposed on a top face of the baseboard;
   at least one light-indicating section is defined on said baseboard;
   a second PCB is positioned underneath said baseboard, wherein at least one light emitter is located directly on the second PCB at a corresponding position with said light-indication section such that when power is supplied to said second PCB, said at least one light emitter will emit light through said light-indication section to enable a user to ascertain position of said keyboard;

said light-indication section comprises a through hole; and said second PCB is adapted to be independently coupled to a power switch.

2. The illumination structure for keyboards according to claim 1, wherein said light-indication section is formed at a position corresponding to an arbitrary pushbutton set.

3. The illumination structure for keyboards according to claim 1, wherein said light-indication section is located at an arbitrary end of said baseboard.

4. The illumination structure for keyboards according to claim 1, wherein said light emitter is a luminescent plate.

5. The illumination structure for keyboards according to claim 1, wherein said light emitter is a light-emitting diode (LED).

6. The illumination structure for keyboards according to claim 1, wherein said second PCB is adapted to be disposed between said baseboard and said first PCB.

* * * * *